Figure 1:
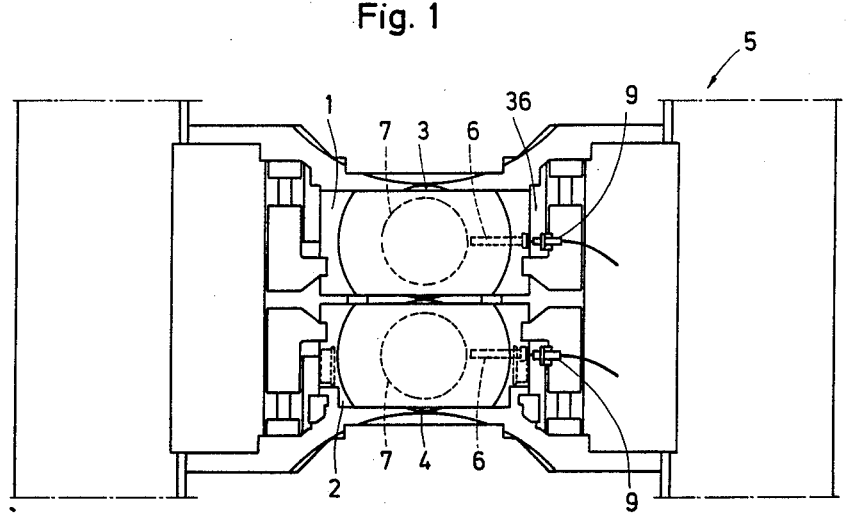

United States Patent [19]

Stahl et al.

[11] Patent Number: 4,939,920
[45] Date of Patent: Jul. 10, 1990

[54] MONITORING DEVICE FOR ROLL BEARINGS IN ROLLING MILLS

[75] Inventors: Werner Stahl, Kreuztal; Axel Barten, Siegen-Sohlbach, both of Fed. Rep. of Germany

[73] Assignee: Achenbach Buschhutten GmbH, Kreuztal, Fed. Rep. of Germany

[21] Appl. No.: 195,682

[22] Filed: May 11, 1988

[30] Foreign Application Priority Data

May 22, 1987 [DE] Fed. Rep. of Germany ....... 3717316

[51] Int. Cl.$^5$ ............................................. B21B 31/00
[52] U.S. Cl. ......................................... 72/237; 72/26; 72/236; 374/173; 384/493; 384/905
[58] Field of Search ............................ 72/26, 236, 237; 374/153; 384/493, 557, 605, 905

[56] References Cited

U.S. PATENT DOCUMENTS

| | | | |
|---|---|---|---|
| 3,527,047 | 9/1976 | Deczky | 374/153 |
| 4,065,190 | 12/1977 | Hallerback | 384/493 |
| 4,116,028 | 9/1978 | Okamoto et al. | 72/237 |
| 4,135,401 | 1/1979 | LeBreton | 374/153 |
| 4,186,606 | 2/1980 | Taruni et al. | 374/153 |
| 4,340,886 | 7/1982 | Boldt et al. | 374/153 |
| 4,354,183 | 10/1982 | Weeks et al. | 374/153 |

FOREIGN PATENT DOCUMENTS 127982 10/1977 Fed. Rep. of Germany .

Primary Examiner—Howard N. Goldberg
Assistant Examiner—Irene Cuda
Attorney, Agent, or Firm—Young & Thompson

[57] ABSTRACT

The monitoring device is constructed in such a way that the temperature measurement takes place directly at the bearing and there is no need for detaching connecting lines during changing of rolls. The main features of the monitoring device for roll bearings, installed, for example, in the chock (1) of the work roll (3) of a roll stand, reside in a thermal limit value pickup (6) in contact with the roll bearing (7), as well as in a mechanical, spring-loaded transmission member (8) locked in place in the chock (1) by way of the limit value pickup, for acting on a signal generator (9) arranged outside of the chock (1) in the roll stand, this signal generator being actuated to shut down the rolling mill by automatic outward movement of the transmission member (8) after releasing its locking device by the limit value pickup (6) upon reaching a limit temperature of the roll bearing (7). The monitoring device is preferably intended for use in thin-gage strip and foil rolling mills having high rolling speeds.

8 Claims, 3 Drawing Sheets

MONITORING DEVICE FOR ROLL BEARINGS IN ROLLING MILLS

The invention relates to monitoring devices for the roll bearings of, in particular, the work rolls in cluster roll stands of rolling mills.

The operating safety of rolling mills, for example of thin-gage strip and foil rolling mills operating at rolling speeds of up to 2,500 m/min with numbers of revolutions of the rolls of 3,000 rpm, requires constant monitoring of the roll bearings.

Monitoring can be established at the bearing itself, or at parts such as the lubricating units which are important for the function of the bearings. Parameters at the bearing proper that can be monitored are friction moment, bearing stress, lubrication condition, bearing temperature, wear and tear, and vibrations. The optimum parameter in monitoring roll bearings is the bearing temperature which rises above the normal operating temperature of the bearings upon the occurrence of bearing damage.

One differentiates between two types of bearing damage:

The bearings fail spontaneously in case of an operational disturbance, for example in case of chipping of the bearing surfaces of the bearing rings due to material fatigue or in case of absence of lubrication. Such an operational breakdown leads to a sudden rise in bearing temperature.

The bearing condition deteriorates continuously, for example if there is inadequate bearing clearance. This leads to a gradual rise in bearing temperature.

For reasons of operating safety, the rolling mill must be shut down immediately in either type of operating disturbances.

The monitoring devices known heretofore work inaccurately, since they do not offer the possibility of taking the bearing temperature directly at the bearing. A further drawback of these monitoring devices resides in that during exchanging of rolls, especially during the more frequently required changing of the work rolls, electrical cables of the monitoring devices must be detached at the separating site between chocks and holding blocks and, respectively, the roll stand, and must be reconnected so that the roll change is delayed and undesired drops in productivity occur as a result.

The invention is based on the object of developing a monitoring device for roll bearings operating at maximum accuracy and being of such a construction that the roll change is not impaired.

Suitable embodiments of the invention are set forth in the dependent claims.

The monitoring device according to this invention operates very exactly and reliably and in no way interferes with the exchanging of rolls because of lack of connecting lines between the thermal limit value pickup in direct contact with the roll bearing and the signal generator.

Figure 2:
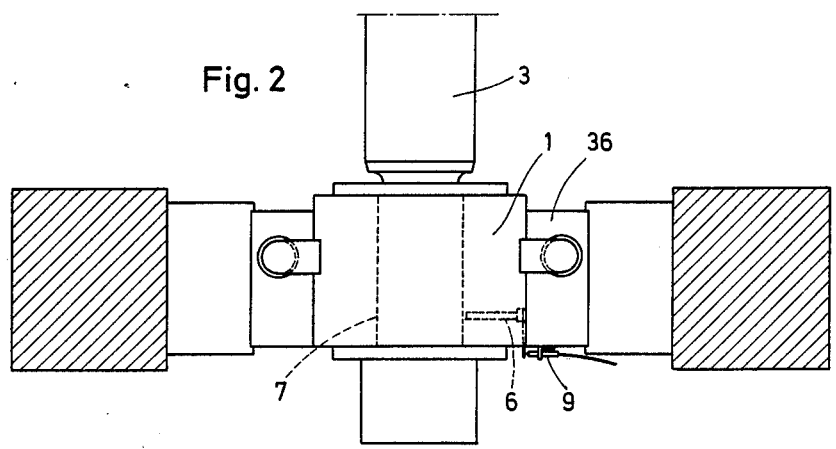
Figure 3:
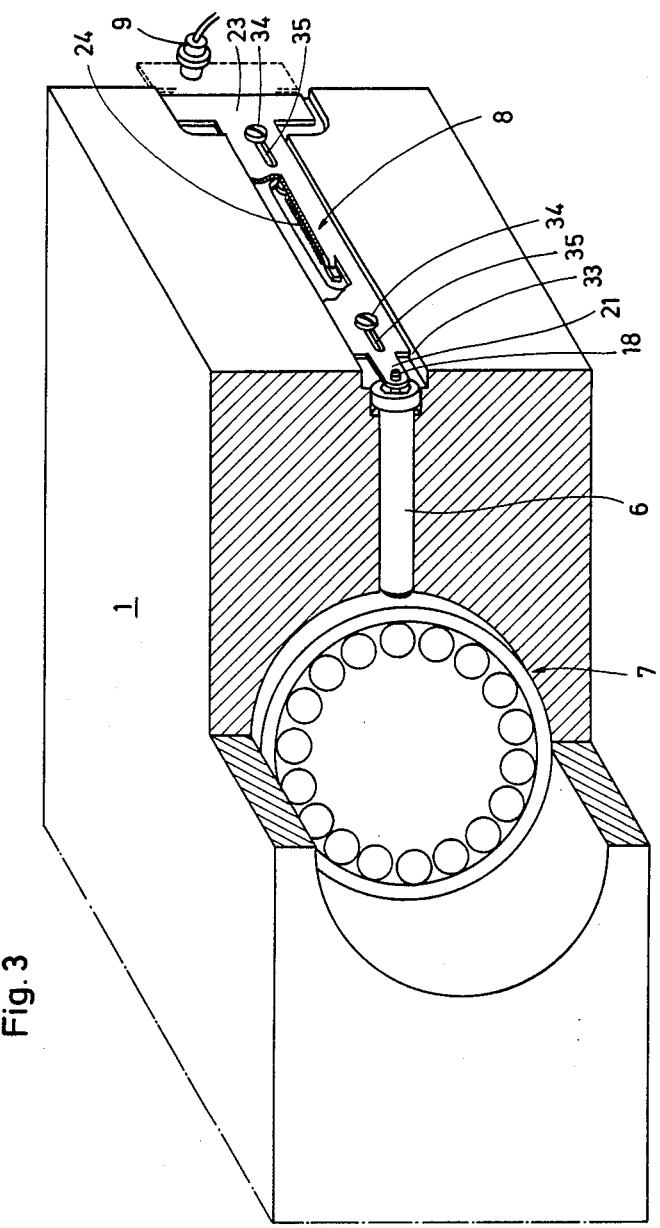
Figure 4:
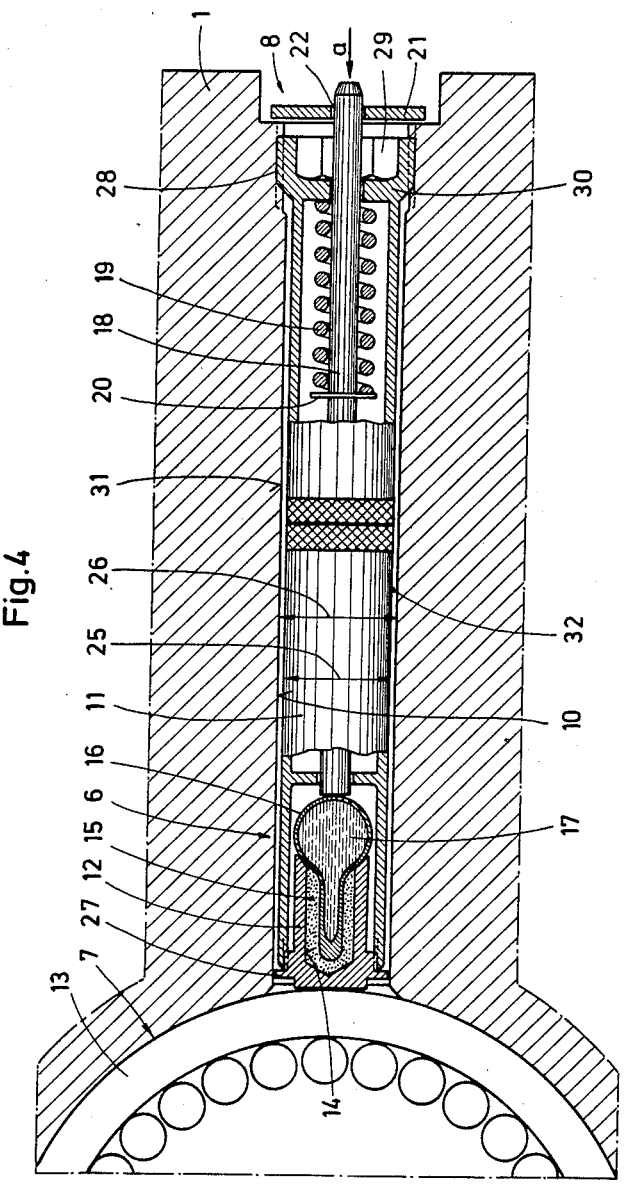

The invention is described in detail below with reference to schematic drawings in its application to a four-high rolling mill. In the drawings:

FIG. 1 shows a lateral fragmentary view of a four-high rolling mill stand without backup rolls, with the monitoring device according to this invention for the roll bearings of the work rolls, FIG. 2 shows a top view of the upper work roll of the roll stand according to FIG. 1, and, respectively in an enlarged representation, FIG. 3 shows a perspective view, partially broken away, of a work roll chock with the monitoring device, as well as FIG. 4 shows a partial longitudinal section through the thermal limit value pickup.

The primary features of the monitoring device for roll bearings, installed in the chocks (1, 2) of the two work rolls (3, 4) of a four-high roll stand (5) according to FIGS. 1 and 2, reside in a thermal limit value pickup (6) in contact with the roll bearing (7), as well as a mechanical, spring-loaded transmission member (8) locked in place in the chocks (1, 2) by way of the limit value pickup, this member serving for acting on a signal generator (9) arranged in the roll stand (5) outside of the chocks (1, 2), this signal generator being activated by automatic outward movement of the transmission member (8) after release of its locking means by the limit value pickup (6) upon reaching a limit temperature of the roll bearing (7), in order to shut down the rolling mill.

The thermal limit value pickup (6) according to FIG. 4, inserted in a bore (10) of, for example, the upper work roll chock (1), exhibits a heat-insulated sleeve (11), a cartridge holder (12) being threaded into the inner end of this sleeve; the cartridge holder is seated, as a heat sensor, on the outer ring (13) of the roll bearing (7) and has a cylindrical bore (14) to accommodate a cartridge (16) of glass embedded in a heat-conducting paste (15) and filled with a chemically inactive fluid (17).

A locking pin (18) is displaceably guided in the sleeve (11) of the limit value pickup (6), the inner end of this pin being urged against the cartridge (16) in the locking position by means of a spring (19) which latter engages at a thrust collar (20) seated on the locking pin (18) and is supported against the outer end of the sleeve (11). The outer end of the locking pin (18) extends into a bore (22) of a fishplate (21) at the inner end of the transmission member (8) of the limit value pickup (6); the transmission member is fashioned as a control lug (23) and is pretensioned by a tension spring (24).

The outer diameter (25) of the sleeve (11) of the limit value pickup (6) is smaller than the diameter (26) of the mounting bore (10) for the pickup (6) in the work roll chock (1), and the sleeve (11) is centered within the mounting bore (10) by means of a spacer rim (27) at the cartridge holder (12) threaded into the inner sleeve end and by means of the outer thread-in end (30) provided with an outer thread (28) and a hexagonal socket (29), in such a way that an air insulating gap (32) is formed between the sleeve (11) and the bore wall (31).

The distance the control lug (23) traverses when being extended out of and being pushed back into the work roll chock (1) is limited by two collar screws (34) threaded into the guide groove (33) for the control lug in the chock; these collar screws engage into slotted holes (35) of the control lug (23).

The signal generator (9), mounted at the retaining block (36) in the roll stand (5) can be designed as a proximity switch, a back-pressure-actuated valve, or as a limit switch.

During operation of the rolling mill, the heat produced in the roll baering (7) flows via the outer ring (13) of the bearing, the cartridge holder (12), and the heat-conducting paste present in the latter to the cartridge (16) in such a way that the chemically inactive and insulating liquid (17) present therein is heated up. The thermal insulation of the sleeve (11) of the limit value pickup (6) and the air insulating gap (32) between the sleeve (11) and the wall (31) of the mounting bore (10) for the pickup extensively prevent heat transfer from the cartridge holder (12) into the chock (1), which would falsify the bearing temperature. Upon the occurrence of an increased bearing temperature of, for example, 170° C. due to bearing damage, the expansion of the liquid, caused by the heat flow from the roll bearing (7), in the cartridge (16) of glass of the limit value pickup (6), which expansion is selected in accordance with a critical bearing temperature, results in bursting of the glass cartridge so that the locking pin (18) is urged by the compression spring (19) in the direction of arrow (a) into the cartridge holder (12), and the control lug (23) is released by the locking pin (18) and is suddenly pushed out of the chock (1) by the tension spring (24) so that the initiator (9) is activated by the control lug (23), and an actuating signal is triggered to shut down the rolling mill.

In a modification of the aforedescribed embodiment, the initiator (9) of the monitoring device for the work roll bearings (7) can be installed in the backup roll chocks if the latter are designed appropriately.

Furthermore, there is the possibility to use a back-pressure-actuated valve or a limit switch as the signal generator.

The aforedescribed device can be utilized in the same way for monitoring the backup roll bearings.

We claim:

1. Monitoring device for roll bearings of work rolls in cluster roll stands of rolling mills, comprising a thermal limit value pickup (6) in contact with a said bearing (7) and being installed in a roll chock (1), and a mechanical, spring-loaded transmission member (8) locked by way of said limit value pickup (6) in said chock (1) to act on a signal generator (9) arranged outside of said chock (1) in a said roll stand (5), this signal generator being activated by automatic outward movement of a transmission member (8) after release from locking means by said limit value pickup (6), upon attainment of a limit temperature of said roll bearing (7), to shut down an associated said rolling mill.

2. Monitoring device according to claim 1, wherein said thermal limit value pickup (6) is inserted in a bore (10) of said chock (1) and has a heat-insulating sleeve (11) with a cartridge holder (12) inserted in an inner end of said sleeve, this cartridge holder being seated as heat sensor on an outer ring (13) of said roll bearing (7) and exhibiting a cylindrical bore (14) for receiving a cartridge (16) of a breakable material, which cartridge is embedded in a heat-conducting paste (15) and is filled with a chemically inactive fluid (17); and locking pin (18) displaceably guided in said sleeve (11) of said limit value pickup (6), an inner end of this pin being urged by a spring (19) against said cartridge (16) in a locking position, and an outer end of this pin engaging in a bore (22) of a fishplate (21) at an inner end of said transmission member (8) of said limit value pickup (6), said transmission member (8) comprising a control lug (23) and being retracted into the chock (1), and (8) being pretensioned by a spring (24).

3. Monitoring device according to claim 2, wherein an outer diameter (25) of said sleeve (11) of said limit value pickup (6) is smaller than a diameter (26) of said mounting bore (10) for said pickup (6) in said chock (1); and said sleeve (11) is centered in said mounting bore (10) by means of a spacer rim (27) at said cartridge holder (12) threaded into an inner sleeve end and by means of an outer thread-in end (30) provided with an external thread (28) and a hexagonal socket (29), in such a way that an insulating gap (32) is formed between said sleeve (11) and a bore wall (31).

4. Monitoring device according to claim 2, further comprising at least one stop for limiting the path of said control lug (23) when moving out of and being inserted into said chock (1).

5. Monitoring device according to claim 4, further comprising two collar screws (34) threaded into a guide groove (33) for said control lug (23) in said chock (1), these screws engaging in slotted holes (35) of said control lug (23) to limit outward and inward movements of said lug.

6. Monitoring device according to claim 1, wherein said signal generator (9) is an initiator.

7. Monitoring device according to claim 1, wherein said signal generator (9) is a back-pressure-operated valve.

8. Monitoring device according to claim 1, wherein said signal generator (9) is a limit switch.

* * * * *